United States Patent
Grossman

(10) Patent No.: US 9,055,346 B2
(45) Date of Patent: Jun. 9, 2015

(54) ARRAY OF TRANSCODER INSTANCES WITH INTERNET PROTOCOL (IP) PROCESSING CAPABILITIES

(71) Applicant: Google Technology Holdings LLC, Mountain View, CA (US)

(72) Inventor: Michael Grossman, San Diego, CA (US)

(73) Assignee: Google Technology Holdings LLC, Mountain View, CA (US)

(*) Notice: Subject to any disclaimer, the term of this patent is extended or adjusted under 35 U.S.C. 154(b) by 0 days.

(21) Appl. No.: 13/862,321

(22) Filed: Apr. 12, 2013

(65) Prior Publication Data

US 2013/0312048 A1   Nov. 21, 2013

Related U.S. Application Data

(60) Provisional application No. 61/649,101, filed on May 18, 2012, provisional application No. 61/649,108, filed on May 18, 2012.

(51) Int. Cl.

| | | |
|---|---|---|
| *H04N 21/654* | (2011.01) | |
| *H04N 21/2343* | (2011.01) | |
| *H04N 21/643* | (2011.01) | |

(52) U.S. Cl.
CPC ..... *H04N 21/654* (2013.01); *H04N 21/234309* (2013.01); *H04N 21/64322* (2013.01)

(58) Field of Classification Search
CPC ............................. H04N 21/654; H04N 19/40
USPC .......................................................... 725/109
See application file for complete search history.

(56) References Cited

U.S. PATENT DOCUMENTS

| 2003/0126608 A1 | 7/2003 | Safadi et al. |
|---|---|---|
| 2004/0218527 A1 | 11/2004 | Schwartz |

(Continued)

FOREIGN PATENT DOCUMENTS

| WO | 02078348 A2 | 10/2002 |
|---|---|---|
| WO | 2010106075 A1 | 9/2010 |
| WO | 2011056224 A1 | 5/2011 |

OTHER PUBLICATIONS

Patent Cooperation Treaty, International Search Report and Written Opinion of the International Searching Authority for International Application No. PCT/US2013/041489, Aug. 8, 2013, 11 pages.

(Continued)

*Primary Examiner* — Jefferey Harold
*Assistant Examiner* — Justin Sanders
(74) *Attorney, Agent, or Firm* — Fish & Richardson P.C.

(57) ABSTRACT

In one embodiment, a method processes video in a system including a host computer processing unit (CPU) and a plurality of transcoder instances. The method receives, by a transcoder instance in the plurality of transcoder instances, first Internet Protocol (IP) packets from a host router coupled to the host CPU. The transcoder instance decapsulates the first IP packets to determine video from a payload of each of the first IP packets and generates a transport stream of video from the video from the payload. The transport stream is in a format in which the transcoder instance can perform a transcoding operation. The transport stream of video is processed by performing the transcoding operation on the transport stream of video. The transcoder instance then encapsulates the processed video from the transport stream of video in second IP packets and sends the second IP packets to a destination.

21 Claims, 7 Drawing Sheets

(56) References Cited

U.S. PATENT DOCUMENTS

| | | | |
|---|---|---|---|
| 2005/0036520 A1* | 2/2005 | Zeng et al. | 370/503 |
| 2006/0168637 A1 | 7/2006 | Vysotsky et al. | |
| 2007/0286263 A1* | 12/2007 | Kwentus et al. | 375/150 |
| 2008/0031275 A1* | 2/2008 | Janky et al. | 370/466 |
| 2009/0201988 A1* | 8/2009 | Gazier et al. | 375/240.06 |
| 2009/0238263 A1 | 9/2009 | Jaggi et al. | |
| 2011/0022679 A1* | 1/2011 | Teener et al. | 709/216 |

OTHER PUBLICATIONS

International Report on Patentability in International Application No. PCT/US2013/041489, mailed Nov. 27, 2014, 8 pages.

* cited by examiner though the MPEG standard is being used, each transcoder SOC instance may include a proprietary MPEG interface. The conversion is performed via field programmable gate array (FPGA) logic to convert video into the MPEG transport stream. The use of proprietary interfaces also complicates the logic as the MPEG transport stream must comply with the proprietary interface. Also, the host CPU sends control commands via a peripheral controller interface (PCI) bus to the transcoder SOC instances. Sending control commands using the PCI bus requires PCI bridge silicon. The use of FPGAs and the PCI bus increases the cost of the transcoder product. Also, the host CPU coordinates the sending of the MPEG transport stream to the transcoder SOC instances and also the control commands via the PCI bus. This causes a bottleneck especially when the host CPU is coordinating the transcoding of video between a large number of transcoder SOC instances.
ARRAY OF TRANSCODER INSTANCES WITH INTERNET PROTOCOL (IP) PROCESSING CAPABILITIES

CROSS-REFERENCES TO RELATED APPLICATIONS

The present disclosure claims priority to:
U.S. Provisional App. No. 61/649,101, entitled "ARRAY OF SYSTEM-ON-A-CHIP TRANSCODER INSTANCES EACH INCORPORATING AN APPLICATION CPU, MEMORY, DISK, NETWORK INTERFACE AND AUDIO/VIDEO PROCESSING BLOCK LINKED AND CONTROLLED BY AN ON-BOARD MANAGED SWITCH/ROUTER SUBSYSTEM", filed May 18, 2012; and
U.S. Provisional App. No. 61/649,108, entitled "MODULAR AND SCALABLE TRANSCODER ARCHITECTURE PARTITIONED VIA IP CONNECTED CIRCUIT BOARDS ENABLING A RANGE OF TRANSCODER SOLUTIONS TO BE PACKAGED BY INSTALLING DIFFERENT CIRCUIT BOARD TYPES ONTO AN ETHERNET SWITCH ROUTER BACKPLANE", filed May 18, 2012, the contents of all of which are incorporated herein by reference in their entirety.

BACKGROUND

Transcoder products have typically been limited to one or two channels. However, system-on-a-chip (SOC) technologies allow a transcoder product to integrate a larger number of transcoder channels into a single chassis via multiple transcoder SOC instances. The transcoder SOC instances may perform transcoding in parallel. A host computer processor unit (CPU) communicates with each of the transcoder SOC instances to coordinate the transcoding. Typically, each transcoder SOC instance requires that video streams be sent and received via a transport interface, such as a motion pictures experts group (MPEG) transport interface. This sends the video in an MPEG transport stream to the transcoder SOC instances using the MPEG standard. Although the MPEG standard is being used, each transcoder SOC instance may include a proprietary MPEG interface. The conversion is performed via field programmable gate array (FPGA) logic to convert video into the MPEG transport stream. The use of proprietary interfaces also complicates the logic as the MPEG transport stream must comply with the proprietary interface. Also, the host CPU sends control commands via a peripheral controller interface (PCI) bus to the transcoder SOC instances. Sending control commands using the PCI bus requires PCI bridge silicon. The use of FPGAs and the PCI bus increases the cost of the transcoder product. Also, the host CPU coordinates the sending of the MPEG transport stream to the transcoder SOC instances and also the control commands via the PCI bus. This causes a bottleneck especially when the host CPU is coordinating the transcoding of video between a large number of transcoder SOC instances.

DETAILED DESCRIPTION

Figure 1:
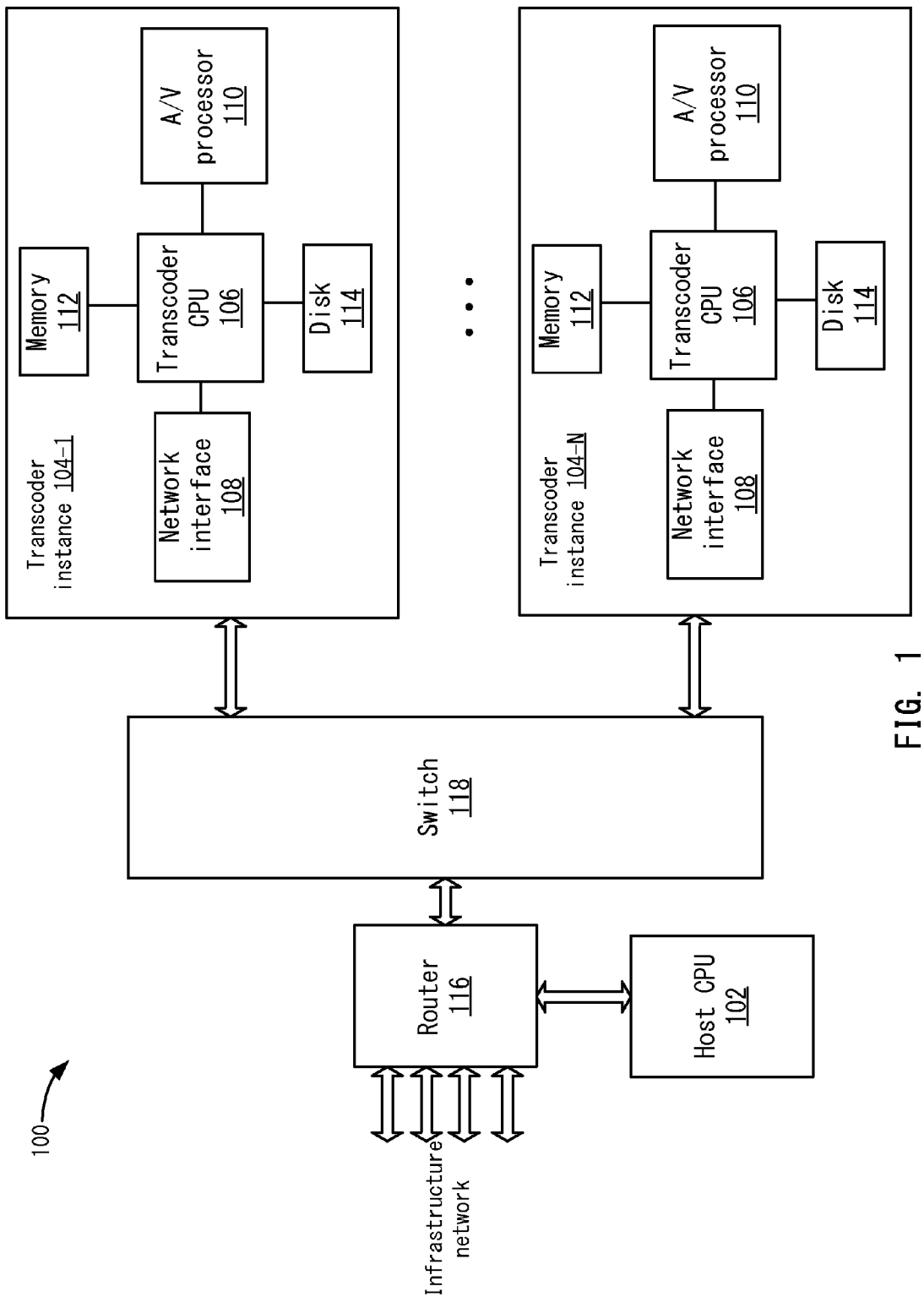
FIG. 1 depicts a system for transcoding video according to one embodiment.

Described herein are techniques for a transcoder including multiple transcoder instances. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

In one embodiment, a method processes video in a system including a host computer processing unit (CPU) and a plurality of transcoder instances. The method receives, by a transcoder instance in the plurality of transcoder instances, first Internet Protocol (IP) packets from a host router coupled to the host CPU. The transcoder instance decapsulates the first IP packets to determine video from a payload of each of the first IP packets and generates a transport stream of video from the video from the payload of each of the first IP packets. The transport stream is in a format in which the transcoder instance can perform a transcoding operation. The transport stream of video is processed by performing the transcoding operation on the transport stream of video. The transcoder instance then encapsulates the processed video from the transport stream of video in second IP packets and sends the second IP packets to a destination.

In one embodiment, an apparatus configured to process video in a system including a host computer processing unit (CPU) and a plurality of transcoder instances includes: one or more computer processors; and a non-transitory computer-readable storage medium containing instructions that, when executed, control the one or more computer processors to be configured for: receiving, by a transcoder instance in the plurality of transcoder instances, first Internet Protocol (IP) packets from a host router coupled to the host CPU; decapsulating, in the transcoder instance, the first IP packets to determine video from a payload of each of the first IP packets; generating, in the transcoder instance, a transport stream of video from the video from the payload of each of the first IP packets, the transport stream being in a format in which the transcoder instance can perform a transcoding operation; processing, in the transcoder instance, the transport stream of video by performing the transcoding operation on the transport stream of video; encapsulating, in the transcoder instance, processed video from the transport stream of video in second IP packets; and sending, by the transcoder instance, the second IP packets to a destination.

In one embodiment, a system includes: a host CPU configured to coordinate routing of IP packets including video; a routing system configured to route the IP packets including the video; and a plurality of transcoder instances, each transcoder instance in the plurality of transcoder instances comprising: an IP interface configured to receive a portion of the IP packets and decapsulate the video within a payload of the portion of the IP packets to form a video transport stream; a transcoder CPU configured to control processing of the video; and a video processor configured to process the video based on a control signal from the transcoder CPU, the processing being performed on the video transport stream, wherein the IP interface encapsulates the processed video into IP packets and sends the IP packets to the routing system.

FIG. 1 depicts a system 100 for transcoding video according to one embodiment. In one embodiment, system 100 may be integrated into a single transcoding device, such as a single chassis device (e.g., a 1RU rack unit). Additionally, system 100 may include multiple rack units that communicate together via a backplane to transcode video.

A host central processing unit (CPU) 102 communicates with multiple transcoder instances 104-1-104-N. Host CPU 102 may be a central processing unit that coordinates transcoding operations to be performed on transcoder instances 104-1-104-N. Although one host CPU 102 is shown, system 100 may include multiple host CPUs.

Transcoder instances 104 may be system-on-a-chip (SOC) entities. Transcoder instances 104 include a transcoder CPU 106 in addition to other entities, such as a network interface 108, an audio/video (A/V) processor 110, memory 112, and disk storage 114. Particular embodiments allow host CPU 102 to offload functions normally performed by host CPU 102 to transcoder instances 104 because each transcoder instance 104 includes a transcoder CPU 106 that is capable of performing some functions normally performed by host CPU 102. Transcoder CPUs 106 then perform the functions in parallel within transcoder instances 104. Each transcoder CPU 104 is responsible for performing tasks within a respective transcoder instance 104 and for other transcoder instances.

In one embodiment, host CPU 102 uses a routing system, such as router 116 and switch 118, to communicate with transcoder instances 104. In one embodiment, the use of router 116 and switch 118 (or other comparable routing systems) allows host CPU 102 to communicate using Internet protocol (IP) packets. For example, each transcoder instance 104 includes a network interface 108 that can receive IP packets. This allows communication between host CPU 102 and transcoder instances 104 via a universal networking standard, such as Ethernet. In this case, host CPU 102 does not need to send control signals via a PCI bus or communicate video via an MPEG transport stream. Rather, the control signals and video data are encapsulated in IP packets and routed via router 116 and switch 118.

By sending video data in IP packets, FPGA logic is not needed to process or send video data in a video transport stream outside of transcoder instances 104. The video transport stream may be in a standard for transcoding video, such as an MPEG. Host CPU 102 offloads the processing of the video transport stream to transcoder instances 104. For example, video data is encapsulated in the IP packets. Transcoder CPU 106 receives the IP packets through network interface 108. Because A/V processor 110 needs to perform transcoding operations on a video transport stream, transcoder instance 104 needs to convert the video in the payload of the IP packets to the video transport stream. Network interface 108 can de-capsulate the received IP packets to retrieve the video data from the payload of the IP packets. Transcoder CPU 106 may then coordinate generation of a video transport stream. Once in this format, transcoder instance 104 can perform various transcoding services on the video transport stream. For example, A/V processor 110 may transcode (e.g., decode then re-encode) the video transport stream.

Host CPU 102 may also send control commands in IP packets. Transcoder CPU 106 may then de-capsulate the IP packets to determine the control signals, which are then processed by transcoder CPU 106. Not only are the video data and control signals sent via the same channel and network interface, expensive PCI silicon and FPGA logic is not needed outside of the transcoder instances 104. [In one embodiment, transcoder CPU 106 generates the video transport stream using transcoder CPU software and A/V processor hardware within the transcoder instance 104 prior to IP packet encapsulation. Transcoder instances 104 may be specialized to perform these operations to generate the video transport stream. That is, because transcoder instances 104 are designed to perform transcoding, having the generation of the video transport stream within transcoder instances 104 is more efficient than having FPGA logic outside of each transcoder instance 104 to generate the video transport stream.

Figure 2:
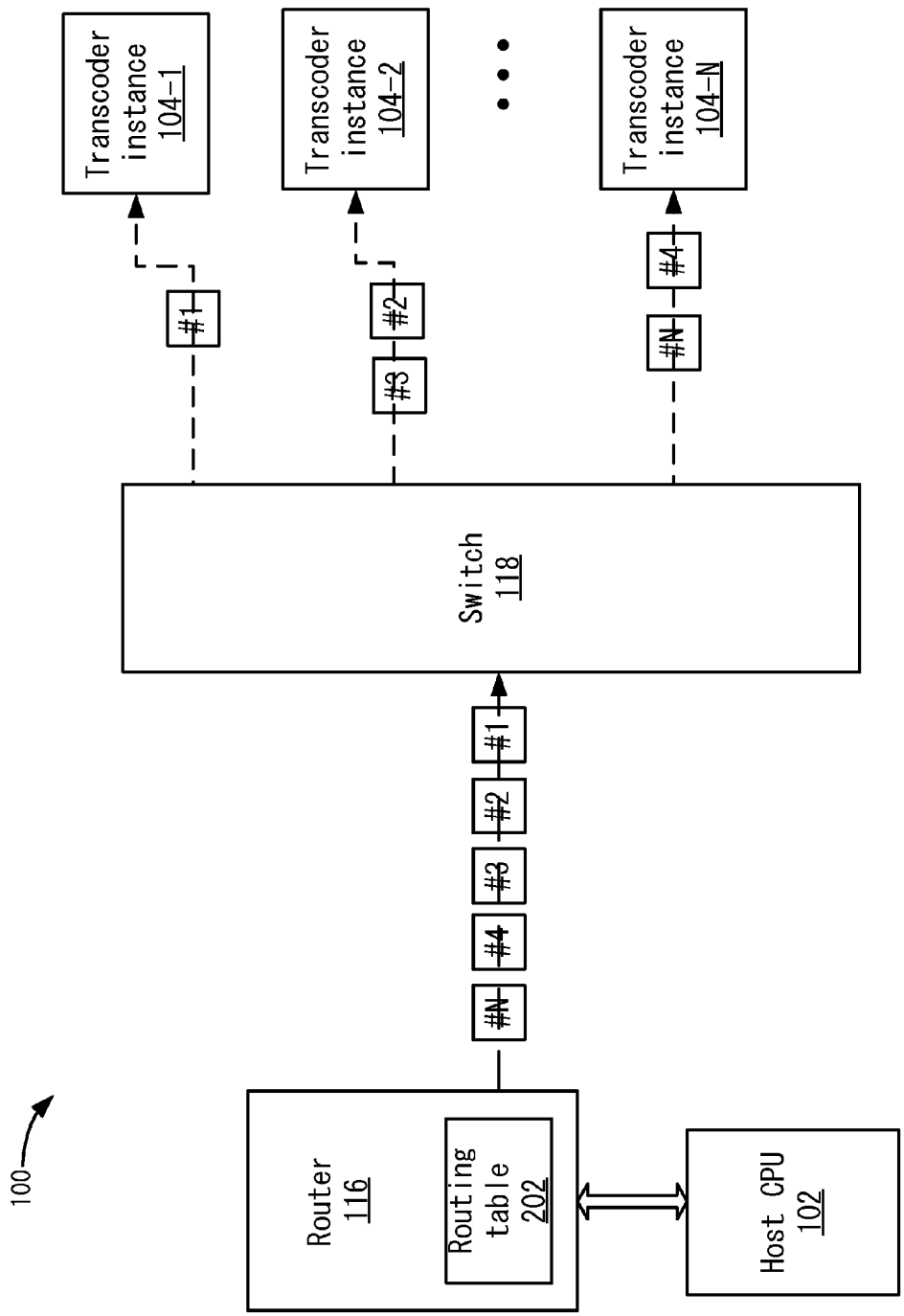
FIG. 2 depicts an example of routing IP packets according to one embodiment.

FIG. 2 depicts an example of routing IP packets according to one embodiment. Router 116 receives packets from the network infrastructure. For example, the packets may include video that needs to be transcoded. Host CPU 102 coordinates the routing of packets to transcoder instances 104. For example, as will be discussed in more detail below, a multicast configuration may be used to route packets to specific transcoder instances 104.

In this example, router 116 is routing packets #1-N. In one example, router 116 uses a routing table 202 to determine where to route the packets. For example, the IP packets are routed depending on what stream the packets are associated with. As will be described below, transcoder instances 104 subscribe to various streams. For simplicity, the routing is described as routing different packets to different transcoder instances 104. For example, router 116 routes an IP packet #1 to transcoder instance 104-1; routes IP packets #2 and #3 to transcoder instance 104-2; and routes IP packets #4-#N to transcoder instance 104-N. Switch 118 may be used to send the IP packets to transcoder instances 104.

Routing video within IP packets is different from sending a video transport stream to transcoder instances 104. That is, router 116 and switch 118 route IP packets using an IP protocol, such as Ethernet. When sending video in a video transport stream, the video data is sent serially. Serial data is sent 1 bit at a time over an interface. Thus, FPGA logic is needed to send the video. However, encapsulating the video in IP packets does not require the FPGA logic to send a serial stream of data. Rather, multiple bits are data are sent in parallel at a much higher data rate.

Figure 3:
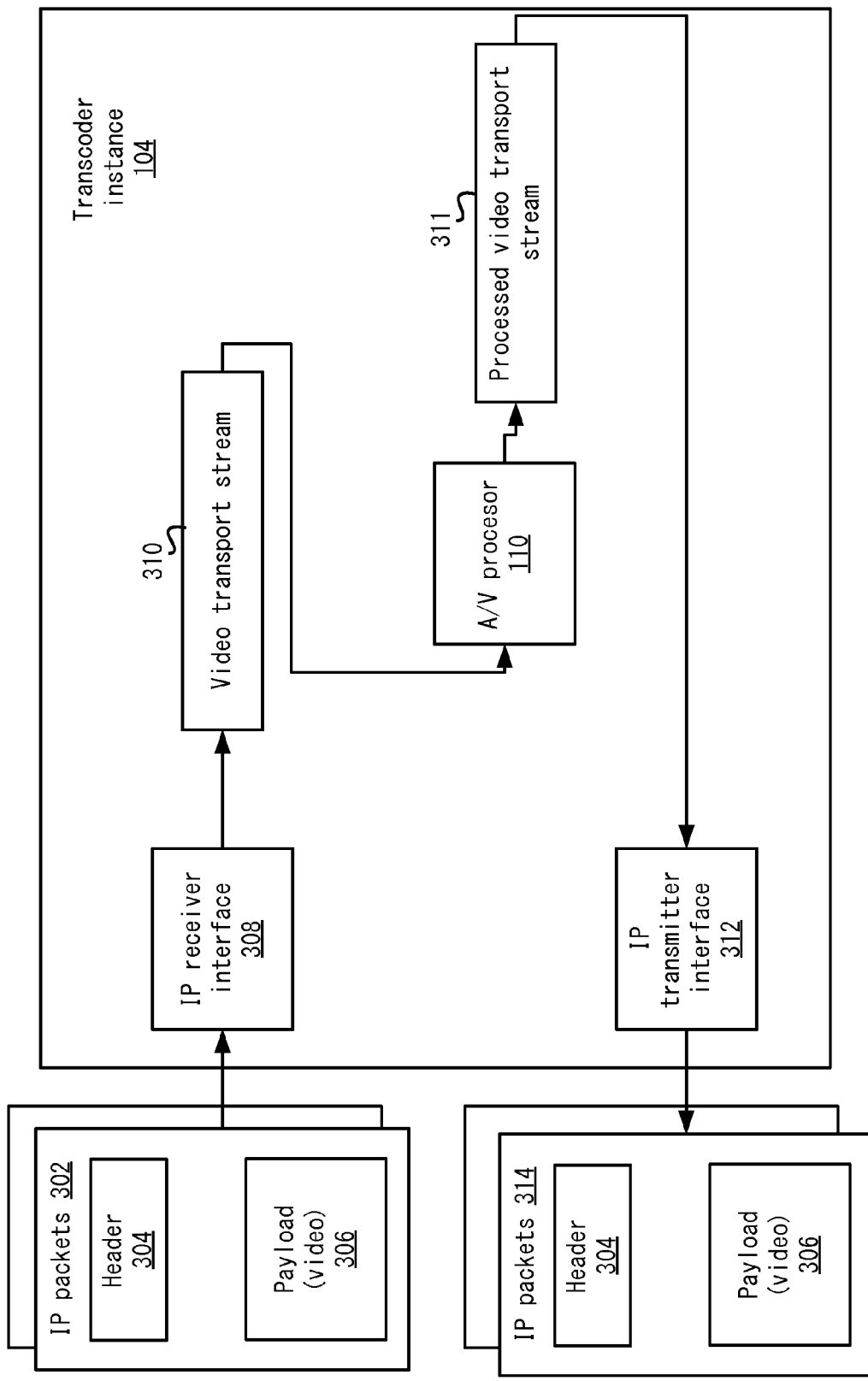
FIG. 3 depicts an example of processing IP packets within a transcoder instance according to one embodiment.

Once receiving the IP packets, transcoder instances 104 need to process the IP packets to retrieve the information included within the payload of the IP packets. For example, the control information and video may be included in the payload of an IP packet. FIG. 3 depicts an example of processing IP packets 302 within a transcoder instance 104 according to one embodiment. IP packets 302 are in the format governed by a universal networking standard, such as Ethernet. In general, each IP packet 302 includes a header 304 and a payload 306. Header 304 may include supplemental data that describes the data being transmitted and how the IP packet should be routed. For example, header 304 includes a destination address. Payload 306 includes the video being transmitted. As is known, the IP packet encapsulates the video in payload 306. Transcoder instance 104 needs an interface to receive IP packet 302. Because IP is a universal standard, the interface that is used is a standard IP interface, such as an IP receiver interface 308.

To process the video within payload 306, IP receiver interface 308 needs to convert the video into a video transport stream, such as an MPEG transport stream, that is in a format defined by the standard being used to encode or decode the video. IP receiver interface 308 may convert the data into the video transport stream as shown at 310. In one embodiment, this converts the video in payload 306 from a parallel format to a serial format. For example, the headers, such as transport control Protocol (TCP)/IP and Ethernet headers are stripped off and the video in the payload is re-assembled into transport packets and input into the transport interface as parallel data to be demultiplexed and decoded. The serialization is performed by a hardware block within a decoder in A/V processor 110. The video transport stream is the format in which transcoding can be performed.

A/V processor 110 receives the transport stream and can perform a transcoding operation on the stream. For example, A/V processor 110 encodes or decodes the transport stream. Other operations may also be performed, such as packaging. The different types of services will be described in more detail below.

After processing, A/V processor 110 outputs the processed video transport stream from transcoder instance 104 at 311. Before the stream can be transmitted from transcoder instance 104, transcoder instance 104 needs to encapsulate the video that is in the video transport stream format to IP packets again. This is because system 100 processes IP packets and not a video transport stream outside of transcoder instances 104. In this case, an IP transmitter interface 312 encapsulates the processed video transport stream into one or more IP packets 314. This converts the data from a serial format to a parallel format. IP transmitter interface 312 then transmits IP packets 314 through switch 118 to router 116. Host CPU 102 then handles routing of IP packets 314. For example, host CPU 102 may route IP packets 314 to another transcoder instance 104 or a destination, such as a decoder.

Figure 4:
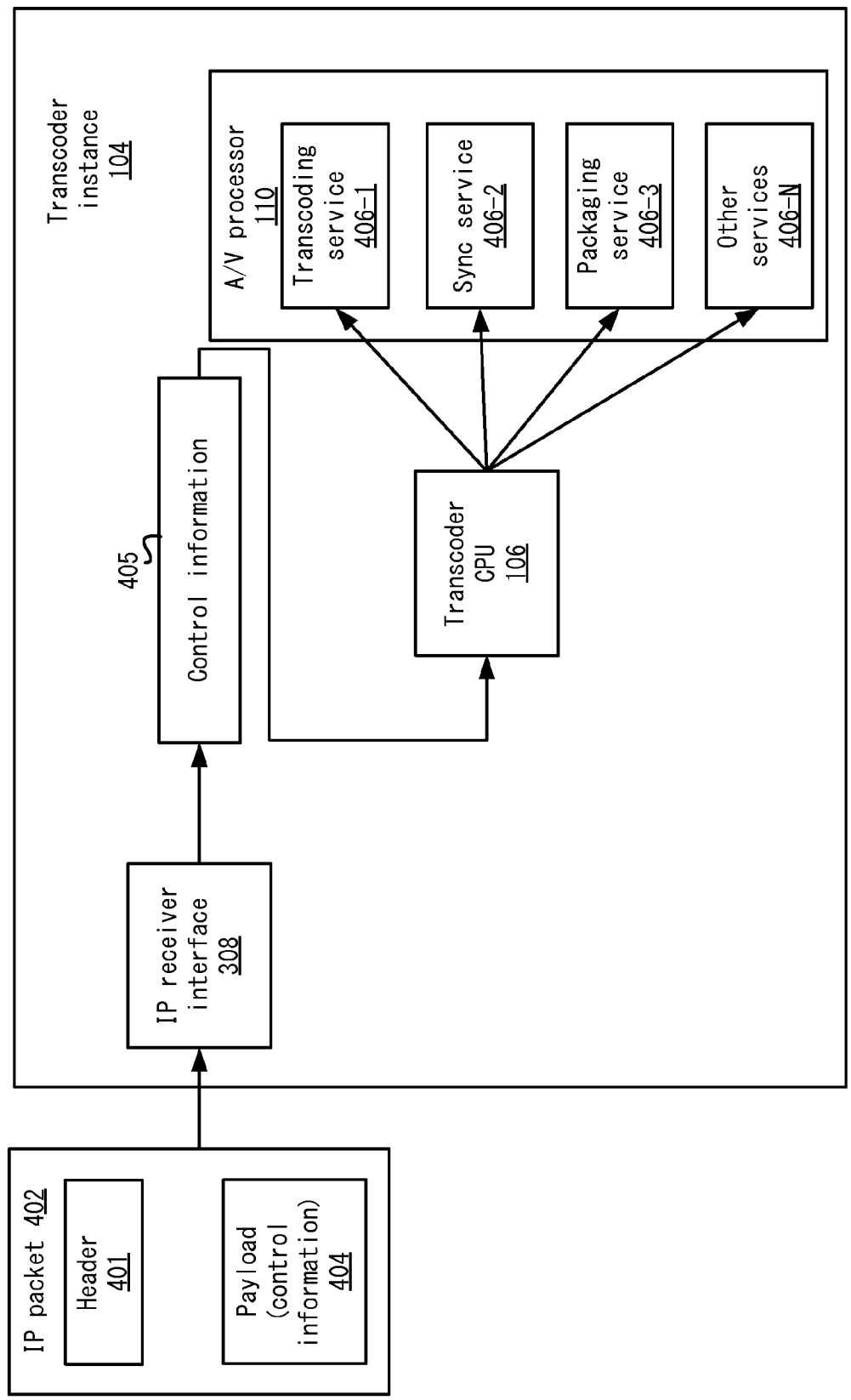
FIG. 4 depicts an example of processing IP packets that include control information according to one embodiment.

In addition to routing video through IP packets, system 100 sends control information through IP packets. The control information provides information to transcoder instances 104 that can be used when performing transcoding operations or services. For example, the control information may synchronize the transcoding being performed among multiple transcoder instances 104. FIG. 4 depicts an example of processing IP packets that include control information according to one embodiment. Router 116 receives an IP packet 402 with control information in a payload 404. IP packet 402 may also include a header 403 that identifies the payload as including control information. Router 116 routes IP packet 402 via switch 118 to a transcoder instance 104. The control information is thus sent through the same channel as the video data.

Transcoder instance 104 may de-capsulate IP packet 402 to determine the control information from payload 404. For example, IP receiver interface 308 receives IP packet 402 and decapsulates the payload to output the control information shown at 405. Transcoder CPU 106 may interpret the control information when performing services. For example, transcoder CPU 106 may use the control information to control AN processor 110 when performing services such as a transcoding service 406-1, a synchronization (sync) service 406-2, a packaging service 406-3, or other services 406-4. Transcoding service 406-1 may perform encoding or decoding of the video data. Synchronization service 406-2 may synchronize the transcoding among multiple transcoding instances 104. Packaging service 406-3 may cut video and audio streams into files for delivery to Internet-connected devices, such as smartphones and tablets. Packaging may also need synchronization among different transcoder instances 104. Thus, sending control information via the same channel as the video allows the synchronization to be performed; whereas, when control information was sent through a different channel using a PCI bus, it was hard to synchronize the data that was received with the control information. Partitioning of the stream and synchronization are also needed for faster than real-time transcoding.

Figure 5A:
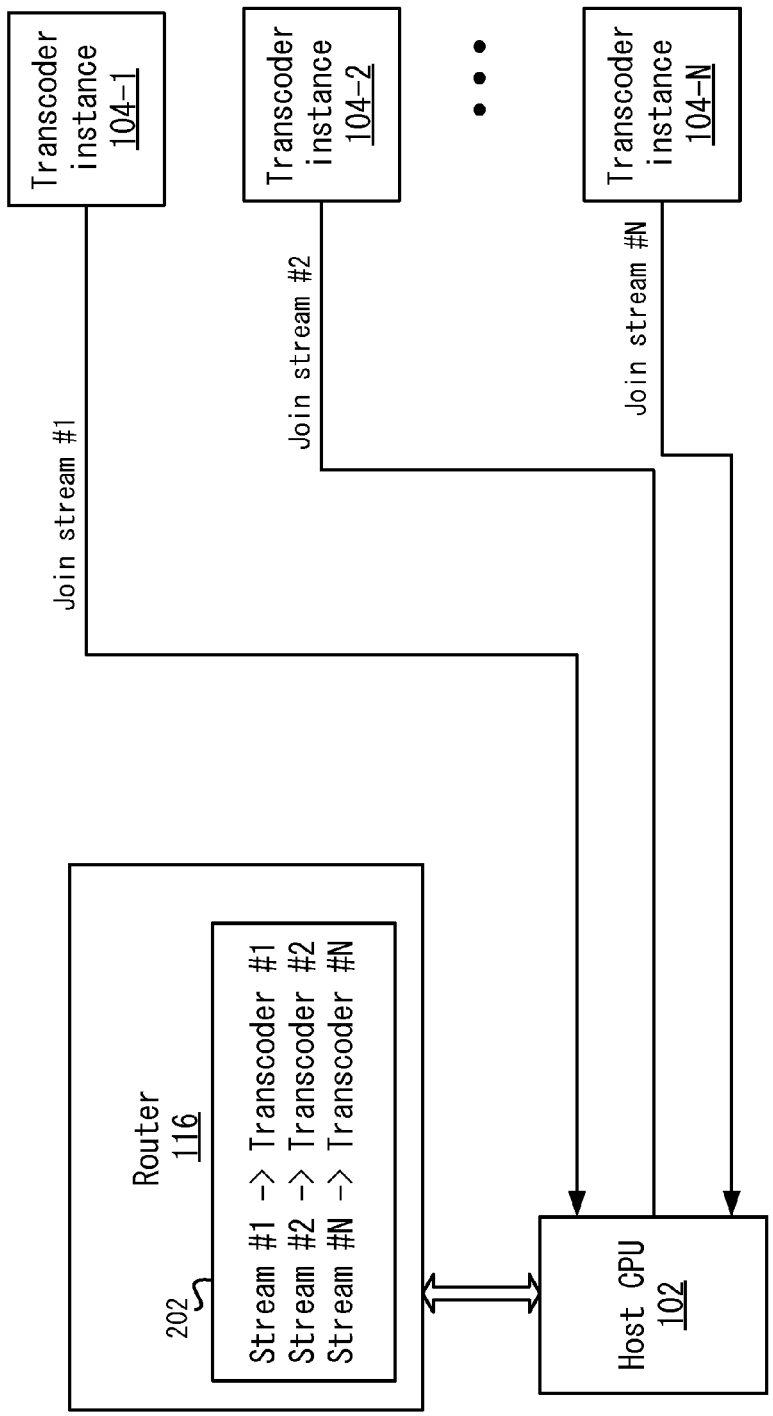
FIG. 5A shows an example of joining a multicast stream according to one embodiment.

The routing of video to various transcoder instances 104 is simplified because IP packets can be routed to transcoder instances 104. For example, router 116 uses a multicast system to determine where to route IP packets. FIG. 5A shows an example of joining a multicast stream according to one embodiment. When transcoder instances 104 want to process video through a stream, each transcoder instance 104 may send a "join stream" command to host CPU 102. For example, host CPU 102 may receive join commands for different streams from different transcoder instances 104. In a specific example, transcoder instance 104-1 may send a join for stream #1; transcoder instance 104-2 may send a join for stream #2; and a transcoder instance 104-N may send a join for stream #N.

Based on receiving the join commands, host CPU 102 may populate routing table 202 with information on how to route IP packets for various streams. For example, host CPU 102 may add an identifier to a stream in routing table 202 for transcoder instances that join certain streams. For stream #1, host CPU 102 adds the identifier for transcoder instance 104-1; for stream #2, host CPU 102 adds the identifier for transcoder instance 104-2; and for stream #N, host CPU 102 adds the identifier for transcoder instance 104-N.

Figure 5B:
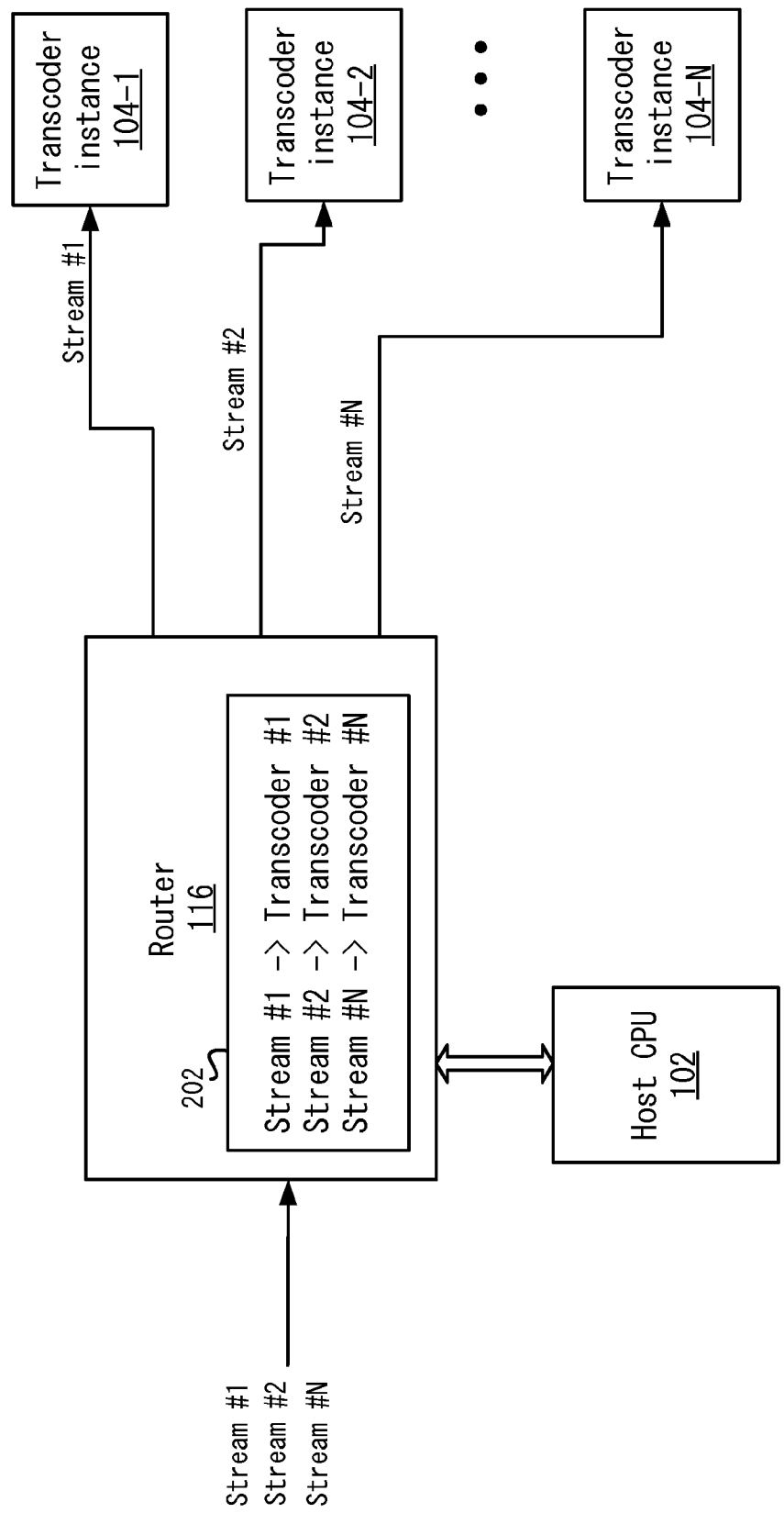
FIG. 5B shows an example of routing IP packets using a multicast architecture according to one embodiment.

Once routing table 202 is populated with which transcoder instances 104 joined which streams, router 116 leverages routing table 202 to route IP packets for the streams. FIG. 5B shows an example of routing IP packets using a multicast architecture according to one embodiment. Router 116 receives streams #1, #2, and #N. When router 116 receives the streams, router 116 checks which transcoder instances 104 have joined each stream using routing table 202. In this case, router 116 routes stream #1 to transcoder instance 104-1, routes stream #2 to transcoder instance 104-2, and routes stream #N to transcoder instance 104-N. Unlike sending a video transport stream, the above routing scheme can be performed without using a large amount of host CPU resources. This is because host CPU 102 offloads the processing of the video transport stream to transcoder instances 104. This frees up host CPU 102 and host CPU 102 does not become a bottleneck in system 100.

Figure 6:
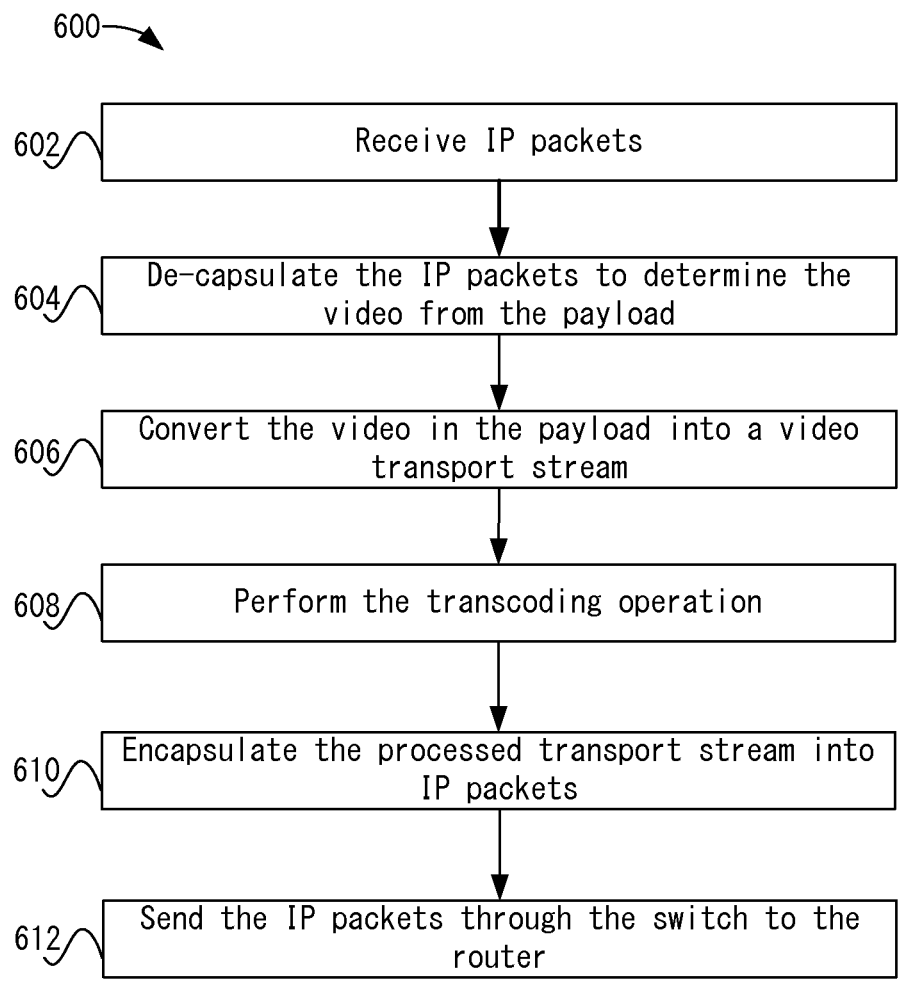
FIG. 6 depicts a simplified flowchart of a method for processing IP packets in a transcoder instance according to one embodiment.

FIG. 6 depicts a simplified flowchart 600 of a method for processing IP packets in a transcoder instance 104 according to one embodiment. At 602, transcoder instance 104 receives IP packets. At 604, transcoder instance 104 decapsulates the IP packets to determine the video from the payload. At 606, transcoder instance 104 converts the video in the payload into a video transport stream that can be processed by A/V processor 110. The transport stream is in a format that allows A/V processor 110 to perform a transcoding operation on the video. At 608, A/V processor 110 performs the transcoding operation. For example, A/V processor 110 may encode or decode the video.

Before sending the processed transport stream, at 610, transcoder instance 104 encapsulates the processed transport stream into IP packets. At 614, transcoder instance 104 sends the IP packets through switch 118 to router 116. Router 116 may then route the IP packets to a destination.

Modular and Scalable Transcoder Architecture

System 100 may be configured in a modular architecture. For example, a modular architecture allows for a wide range of transcoder solutions to be packaged within the same chassis and backplane design without the need to re-design other parts of the system. By providing an IP-based interface, such as IP receiver interface 308 and IP transmitter interface 312, the interfaces are standardized for transcoder instances 104. That is, each transcoder instance 104 would use the same protocol to send and receive IP packets. However, if the conventional MPEG transport stream for video and PCI being used for control is used, different transcoder instances 104 may use proprietary non-IP based interfaces that would not allow common interfacing techniques to be used. That is, when a transcoder instance 104 needs to be inserted into system 100, the proprietary non-IP based interface would not allow for a modular architecture to be realized. Rather, programming to insert the new transcoder instance 104 would be needed to interface with the proprietary interface. However, because system 100 includes a common IP-based backplane design in which each transcoder instance 104 communicates via an IP protocol, such as Ethernet, to router 116 and switch 118 for both control and also communication of video, transcoder instances 104 may be removed and inserted in a modular fashion. That is, reconfiguration of the system is not needed to insert various transcoder instances 104.

Also, the use of an IP-based backplane design for communication enables system 100 to be highly scalable by cascading multiple Ethernet switches 118 and routers 116. That is, additional routers and switches may be added as additional transcoder instances 104 are added. Transcoder instances 104 are designed to be plug-compatible with common physical and electrical characteristics. Also, the structure of the system software can also be common such that once a transcoder instance 104 is allocated, the IP session is transferred to that transcoder instance 104 until completion Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for processing video in a system including a host computer processing unit (CPU) and a plurality of transcoder instances, the method comprising:
   encapsulating, by the host CPU for each of multiple Internet Protocol (IP) packets, a control signal and video data in a payload of the corresponding IP packet;
   routing, by the host CPU, some of the IP packets to a particular one of the transcoder instances using a host router coupled to the host CPU;
   receiving, by the particular one of the transcoder instances, the some of the IP packets;
   decapsulating, using an IP interface in the particular one of the transcoder instances, each of the some of the IP packets to determine the corresponding control signal and the corresponding video data from the payload of the corresponding IP packet;
   generating, in the particular one of the transcoder instances, a transport stream of video from the video data, the transport stream being in a format in which the transcoder instance can perform a transcoding operation;
   processing, using a video processor in the particular one of the transcoder instances, the transport stream of video by performing the transcoding operation on the transport stream of video using the corresponding control signals;
   encapsulating, using the IP interface in the particular one of the transcoder instances, processed video from the transport stream of video in other IP packets; and
   sending, by the transcoder instance, the other IP packets to a destination.

2. The method of claim 1, wherein generating the transport stream of video comprises performing a parallel to serial conversion of the video data from the payload of each of the some of the IP packets to generate the transport stream of video.

3. The method of claim 2, wherein encapsulating the processed video from the transport stream of video in the other IP packets comprises performing a serial to parallel conversion of the transport stream of video before encapsulating the processed video from the transport stream of video in the other IP packets.

4. The method of claim 1, wherein processing the transport stream of video comprises encoding or decoding the transport stream of video.

5. The method of claim 1, wherein:
   receiving the some of the IP packets is through a first IP network interface, of the particular one of the transcoder instances, configured to receive IP packets; and
   sending the other IP packets IS through a second IP network interface, of the particular one of the transcoder instances, configured to send IP packets.

6. The method of claim 1, further comprising:
   sending, by the particular one of the transcoder instances, a multicast join stream command to the host CPU to join a multicast stream of IP packets; and
   receiving the some of the IP packets from the multicast stream of IP packets.

7. An apparatus configured to process video in a system including a host computer processing unit (CPU) and a plurality of transcoder instances comprising:
   one or more computer processors; and
   a non-transitory computer-readable storage medium containing instructions that, when executed, control the one or more computer processors to be configured for:
      encapsulating, by the host CPU for each of multiple Internet Protocol (IP) packets, a control signal and video data in a payload of the corresponding IP packet;
      routing, by the host CPU, some of the IP packets to a particular one of the transcoder instances using a host router coupled to the host CPU;
      receiving, by the particular one of the transcoder instances, the some of the IP packets;
      decapsulating, using an IP interface in the particular one of the transcoder instances, each of the some of the IP packets to determine the corresponding control signal and the corresponding video data from the payload of the corresponding IP packet;

generating, in the particular one of the transcoder instances, a transport stream of video from the video data, the transport stream being in a format in which the transcoder instance can perform a transcoding operation;

processing, using a video processor in the particular one of the transcoder instances, the transport stream of video by performing the transcoding operation on the transport stream of video using the corresponding control signals;

encapsulating, using the IP interface in the particular one of the transcoder instances, processed video from the transport stream of video in other IP packets; and sending, by the transcoder instance, the other IP packets to a destination.

8. The apparatus of claim 7, wherein generating the transport stream of video comprises performing a parallel to serial conversion of the video from the payload of each of the some of the IP packets to generate the transport stream of video.

9. The apparatus of claim 8, wherein encapsulating the processed video from the transport stream of video in the other IP packets comprises performing a serial to parallel conversion of the transport stream of video before encapsulating the processed video from the transport stream of video in the other IP packets.

10. A system comprising:
a host CPU configured to encapsulate, for each of multiple Internet Protocol (IP) packets, a control signal and video data in a payload of the corresponding IP packet and coordinate routing of the IP packet;
a routing system configured to route the IP packets; and
a plurality of transcoder instances, each transcoder instance in the plurality of transcoder instances comprising:
an IP interface configured to receive at least some of the IP packets from the routing system and decapsulate the control signals and the video data from the payload of the received IP packets to form a video transport stream;
a transcoder CPU configured to control processing of the video transport stream using the control signals from the payload; and
a video processor, controlled by the transcoder CPU, configured to process the video transport stream, wherein the IP interface encapsulates the processed video transport stream into other IP packets and sends the other IP packets to the routing system.

11. The system of claim 10, wherein the routing system includes a router configured to route IP packets to the plurality of transcoder instances.

12. The system of claim 11, wherein the routing system includes a switch that receives the IP packets from the router and sends the IP packets to respective transcoder instances in the plurality of transcoder instances based on routing information within the IP packets.

13. The system of claim 11, wherein the router uses a routing table to determine which transcoder instances to route IP packets to.

14. The system of claim 13, wherein the host CPU:
receives multicast join commands from transcoder instances in the plurality of transcoder instances to join different multicast streams of IP packets; and
adds identifiers for the transcoder instances in the routing table to cause the router to route IP packets for the different streams to respective transcoder instances using multicasting.

15. The system of claim 11, wherein the router:
routes the IP packets including video to be processed by the plurality of transcoder instances; and
receives the IP packets including video processed by the plurality of transcoder instances.

16. The system of claim 10, wherein the plurality of transcoder instances are modular by using a same network interface to receive the IP packets.

17. The system of claim 14, wherein each of the transcoder instances subscribes to only one stream of IP packets from the routing system.

18. The system of claim 17, wherein each of the streams of IP packets is sent to only one of the transcoder instances.

19. The system of claim 10, wherein two or more of the plurality of transcoder instances use corresponding controls signals to synchronize processing by the corresponding video processors.

20. The system of claim 10, wherein a header of each of the IP packets indicates that the payload includes the control signal.

21. The system of claim 10, wherein at least one of the transcoder CPUs uses the corresponding control signal for a transcoding process or a packaging process.

* * * * *